(12) United States Patent
Bogdan et al.

(10) Patent No.: US 7,365,459 B2
(45) Date of Patent: Apr. 29, 2008

(54) ELECTRIC MOTOR

(75) Inventors: Kreca Bogdan, Zalec (SI); Purnat Matjaz, Mozirje (SI); Seifried Radovan, Maribor (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 587 days.

(21) Appl. No.: 10/928,216

(22) Filed: Aug. 27, 2004

(65) Prior Publication Data

US 2005/0040717 A1 Feb. 24, 2005

Related U.S. Application Data

(63) Continuation of application No. PCT/EP03/01674, filed on Feb. 19, 2003.

(30) Foreign Application Priority Data

Feb. 27, 2002 (DE) ............... 102 08 367

(51) Int. Cl.
*H02K 5/14* (2006.01)
*H02K 5/22* (2006.01)
(52) U.S. Cl. .......................... 310/71; 310/89
(58) Field of Classification Search ............ 310/71, 310/239–242, 40 MM, 89, 91, 68 R, 51
See application file for complete search history.

(56) References Cited

U.S. PATENT DOCUMENTS

| 4,309,815 A | * | 1/1982 | Schmitt et al. | ........ 310/40 MM |
| 4,513,214 A | * | 4/1985 | Dieringer | ........... 310/71 |
| 4,673,837 A | | 6/1987 | Gingerich et al. | ........ 310/239 |
| 5,015,894 A | * | 5/1991 | Crow et al. | .......... 310/71 |
| 5,196,750 A | | 3/1993 | Strobl | ............. 310/239 |
| 5,350,960 A | * | 9/1994 | Kiri et al. | ........... 310/71 |
| 6,106,324 A | * | 8/2000 | Kwapien et al. | ......... 310/71 |

FOREIGN PATENT DOCUMENTS

| DE | 198 10 873 A1 | 11/1998 |
| DE | 199 02 433 C1 | 9/2000 |
| DE | 299 24 031 U1 | 11/2001 |
| GB | 2 172 754 A | 9/1986 |
| WO | 03/010873 A2 | 2/2003 |

* cited by examiner

*Primary Examiner*—Tran Nguyen
(74) *Attorney, Agent, or Firm*—Russell W. Warnock; James E. Howard

(57) ABSTRACT

An electric motor has a hollow-cylindrical motor housing containing end plates that are mounted in the motor housing via respective centering flanges. A discrete electrical component is connected in parallel to electrical connections of the electric motor that are formed by contact elements disposed on the first end plate. The component is linked with at least one of the contact elements via a lead. The lead is inserted in a first, substantially V-shaped groove that tapers in the direction of insertion. The groove is provided with a recess into which the contact element can be pressed.

10 Claims, 3 Drawing Sheets

ELECTRIC MOTOR

CROSS-REFERENCE TO RELATED APPLICATION

This is a continuing application, under 35 U.S.C. § 120, of copending international application No. PCT/EP03/01674, filed Feb. 19, 2003, which designated the United States; this application also claims the priority, under 35 U.S.C. § 119, of German patent application No. 102 08 367.3, filed Feb. 27, 2002; the prior applications are herewith incorporated by reference in their entirety.

BACKGROUND OF THE INVENTION

FIELD OF THE INVENTION

The present invention relates to an electric motor having a hollow-cylindrical motor housing and a rotor that is mounted in first and second end frames. The end frames are each mounted in the motor housing by a centering flange. The electric motor further has a discrete electrical component that is connected in parallel with electrical connections of the electric motor which are formed by contact elements disposed on the first end frame. The component is connected to at least one of the contact elements through a first connecting wire.

Electric motors such as these are manufactured by BSH Bosch and Siemens Hausgeräte GmbH at the time at which this application is submitted. They are used for small domestic appliances such as mixers, citrus presses, food slicers and the like. Small appliances such as these have a DC motor, with a capacitor connected in parallel with it functioning as a radio suppression filter. In the case of these motors, the connecting wires of the capacitor are connected on the one hand to an electrical connecting pin for a contact brush, and on the other hand to an electrically conductive motor housing. The connections are produced by spot welding or by clamping the connecting wire in at the side into a depression within the end frame.

An electric motor for a mixer is known, for example, from Published, Non-Prosecuted German Patent Application DE 198 10 873 A1. This motor also has a rotor that is mounted in a motor housing between two end frames such that it can rotate. On one side of the rotor, there is a commutator with a contact surface against which contact brushes, which are formed in the first end frame, rest, stressed by springs, such that they slide. The contact brushes are connected to a printed circuit board, which extends in the direction of the rotor axis.

SUMMARY OF THE INVENTION

It is accordingly an object of the invention to provide an electric motor which overcomes the above-mentioned disadvantages of the prior art devices of this general type, in which the electrical contacts can be produced in a simple manner.

With the foregoing and other objects in view there is provided, in accordance with the invention, an electric motor. The electric motor contains a hollow-cylindrical motor housing and a first and a second end frame. The first end frame has a groove being substantially V-shaped and tapers in an insertion direction in a first part and in a second part the groove has a depression shape. A rotor is mounted in the first and the second end frame. Centering flanges mount each of the first and the second end frame in the motor housing. Contact elements functioning as electrical connections are provided and at least one of the contact elements is disposed in the depression of the first end frame. A connecting wire is inserted into the groove and a discrete electrical component is connected in parallel with the electrical connections. The discrete electrical component is connected to at least one of the contact elements through the connecting wire.

According to the invention, in the case of an electric motor of the type mentioned initially, the object is achieved in that the first connecting wire is inserted into a first groove, which is substantially V-shaped and tapers in the insertion direction. A depression into which the contact element can be pushed is provided in the groove.

The method according to the invention results in a simple and reliable electrical connection between the connecting wire which leads to the component, for example a capacitor, and the contact element. A good conductive connection is produced.

It is particularly appropriate to use a contact element that has a second, substantially V-shaped, groove on its lower face, which tapers in the opposite direction to the insertion direction. Since the connecting wire is clamped in between two V-shaped grooves, the wire is fixed very precisely at one-point.

In a preferred embodiment, the contact element is in the form of a flat platelet, and in that the depression is in the form of a slot corresponding to the cross section of the contact element.

The motor housing is preferably composed of an electrically conductive material, and the contact element and/or the component is electrically connected to the motor housing by a second connecting wire.

The invention likewise relates to an electric motor having a hollow-cylindrical motor housing and a rotor that is mounted in first and second end frames. The end frames are each mounted in the motor housing via a centering flange, as well as electrical connections, which are disposed on the first end frame and one of which is connected to the motor housing.

Once again the object is to provide a simple electrical connection.

According to the invention, the object is achieved in that the motor housing is composed of an electrically conductive material, and an that the second connecting wire is inserted between the centering flange of the first end frame and the motor housing.

This measure saves a spot-welding process by which, in the case of conventional electric motors, the end of a connecting wire is fitted to the outside of the metallic motor housing by spot welding.

The invention also results in that there is no need to use a spot-welding machine. The contact-making process is carried out at the same time that the end frame is pressed into the motor housing. This results in a reliable conductive connection to the sheet-metal housing of the motor, which has sufficient mechanical strength. There are no longer any spot welds, which interfere with the assembly process, on the outer surface of the motor housing.

On its centering flange, by which it is pushed into the motor housing, the end frame preferably has an outward bulge which extends in the radial direction and on whose inner wall, or on whose base, the end of the second connecting wire is place. In a corresponding manner, the motor housing has a tongue, which clamps the end of the connecting wire in on the base of the outward bulge.

Other features which are considered as characteristic for the invention are set forth in the appended claims.

Although the invention is illustrated and described herein as embodied in an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
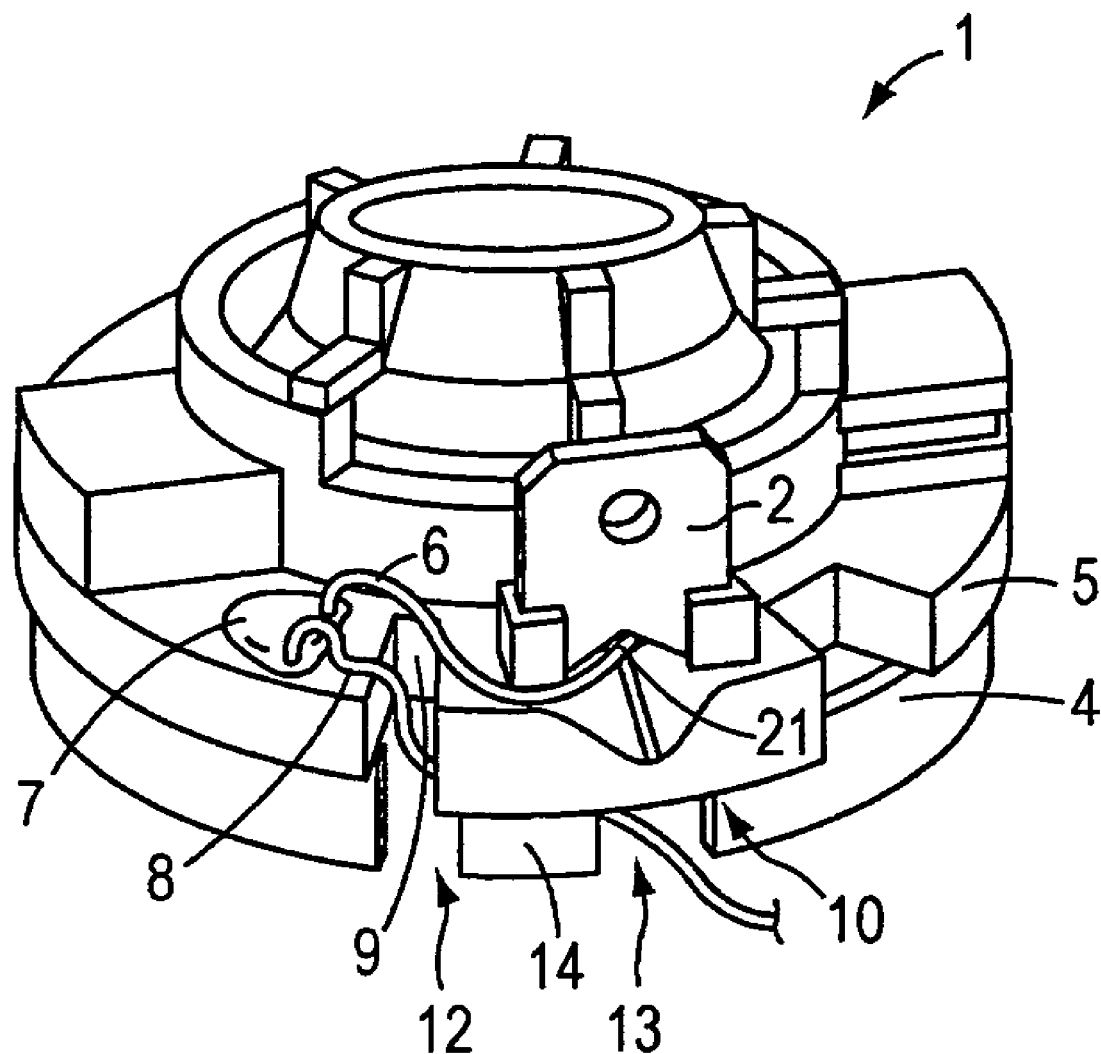
FIG. 1 is a diagrammatic, perspective view of an end frame with a contact element according to the invention.
Figure 2:
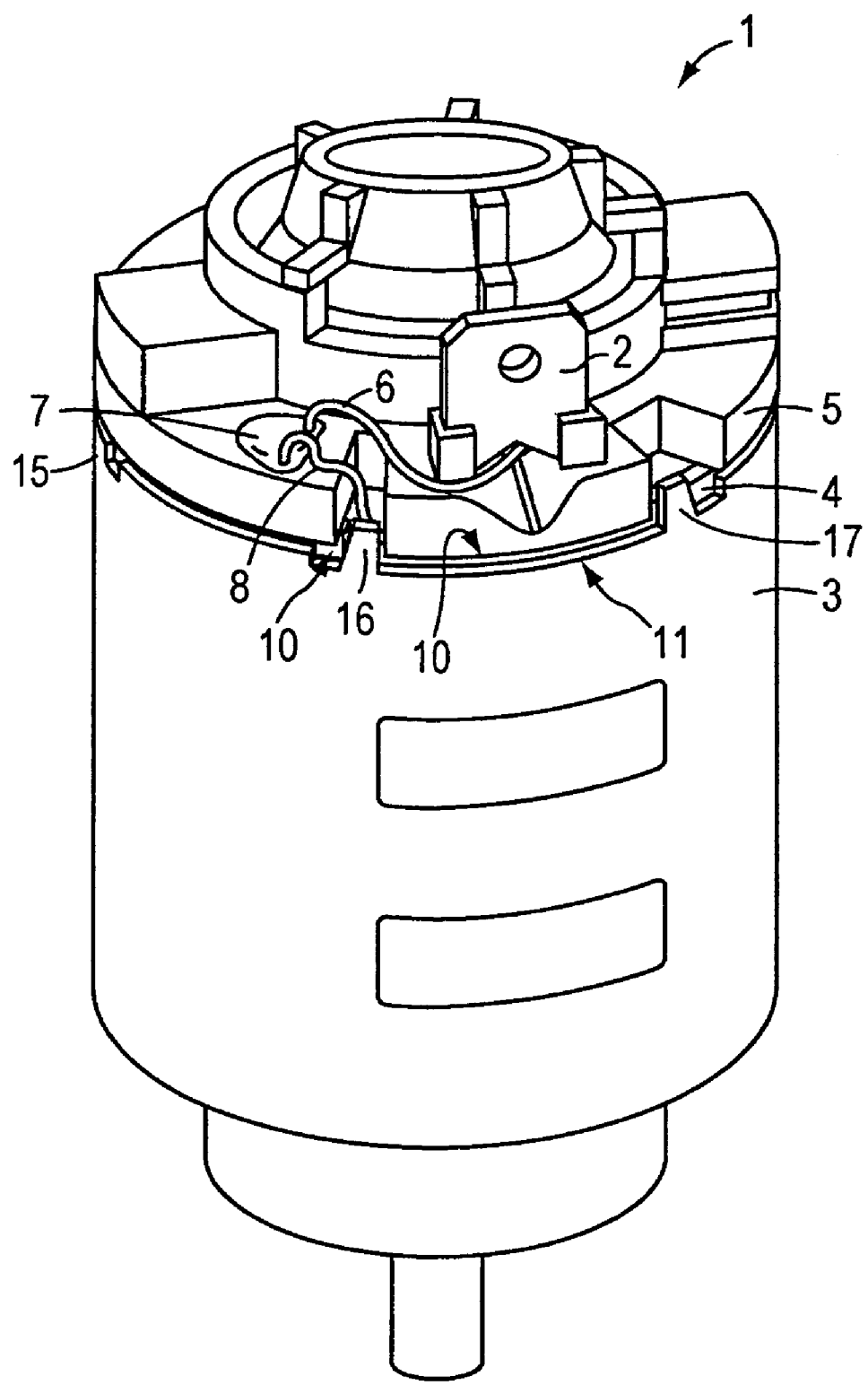
FIG. 2 is a diagrammatic, perspective view of the end frame as shown in FIG. 1, in conjunction with a motor housing.

Referring now to the figures of the drawing in detail and first, particularly, to FIG. 1 thereof, there is shown an electric motor that has a stator and a rotor. The rotor is mounted between two end frames. One end frame 1 is fitted with two electrical contact elements 2. The contact elements 2 produce the electrical connection between electrical connections of the electrical appliance and contact brushes of the electric motor. The electric motor has a housing 3 (FIG. 2) composed of sheet metal, which holds the laminated cores of the stator on its inside. The two end frames are pushed into the housing 3 by a collar 4 on a centering flange 5, and are connected to the housing 3 with a push fit.

The contact element 2 is connected to the housing 3 via a connecting wire 6, a capacitor 7 and a connecting wire 8. The connecting wire 8 is located in an outward bulge 9 of the centering flange 5, and projects out between a lower edge 10 of the centering flange 5 and an upper edge 11 of the housing 3, such that the end of the connecting wire 8 can be removed flush with the outer casing wall of the housing 3 and of the centering flange 5. The collar 4 preferably has two recesses 12, 13, through which the connecting wire 8 is pushed around a projection 14 on the collar 4 on the inside.

Figure 3:
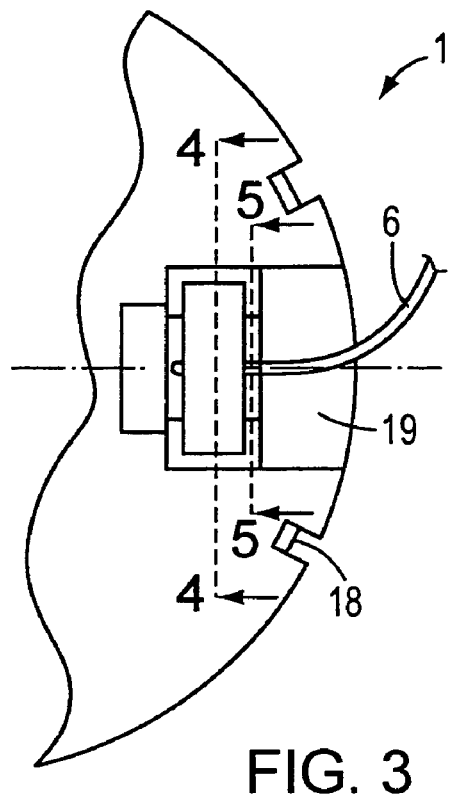
FIG. 3 is a plan view of a centering flange of the end frame.
Figure 4:
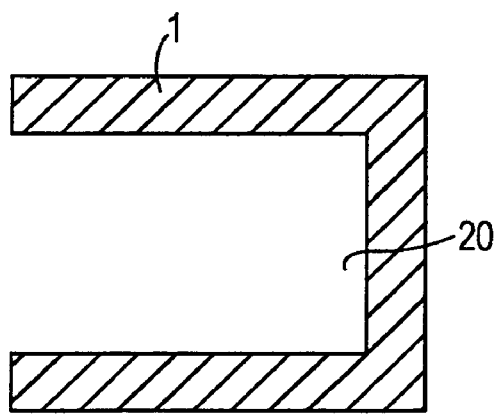
FIG. 4 is a sectional view taken along the line IV-IV shown in FIG. 3.
Figure 5:
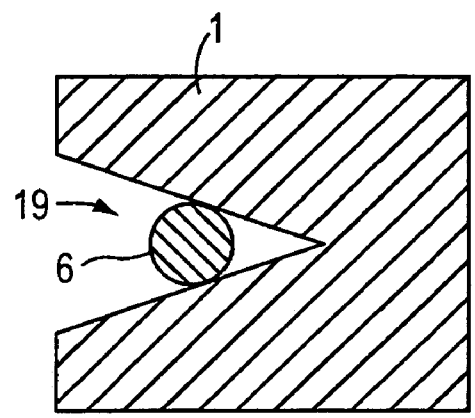
FIG. 5 is a sectional view taken along the line V-V shown in FIG. 3.

The housing 3 has tongues 15, 16, 17 which project in the area of its upper edge 11 and are bent inwards in order to attach the end frame 1 to the housing 3. In this case, the tongue 15 rests on a base 18 (FIG. 3) of the outward bulge 9, and clamps the connecting wire 8 against the base 18.

The connecting wire 6 is clamped in firmly with respect to the end frame 1, by fitting it into a V-shaped groove. 19. The groove 19 has a depression 20 that is in the form of a slot and essentially runs at right angles to the direction of the groove 19. The depression 20 holds the contact element 2, which pushes the connecting wire 6 downward into the depression 20, while it is itself being pushed into the depression 20, thus clamping the connecting wire 6 firmly.

In addition, the contact element 2 likewise has a V-shaped groove 21 on its lower face, so that the connecting wire 6 is clamped in in a localized form very precisely on both sides.

We claim:

1. An electric motor, comprising:
a hollow-cylindrical motor housing;
a first end frame, said first end frame having a groove formed therein, said groove being substantially V-shaped and tapering in an insertion direction in a first part, said groove in a second part having a depression shape;
a rotor mounted in said first end frame;
centering flanges mounting said first end frame in said motor housing;
contact elements functioning as electrical connections and at least one of said contact elements disposed in said depression of said first end frame;
a connecting wire inserted into said groove; and
a discrete electrical component connected in parallel with said electrical connections, said discrete electrical component connected to at least one of said contact elements through said connecting wire.

2. The electric motor according to claim 1, wherein at least one of said contact elements has a substantially V-shaped contact groove tapering in an opposite direction to the insertion direction, on a lower face.

3. The electric motor according to claim 1, wherein at least one of said contact elements has a flat platelet shape, and said depression is slot shaped corresponding to a cross section of said one of said contact elements.

4. An electric motor, comprising:
a hollow-cylindrical motor housing composed of an electrically conductive material;
a first end frame, said first end frame having a groove formed therein, said groove being substantially V-shaped and tapering in an insertion direction in a first part, said groove in a second part having a depression shape;
a rotor mounted in said first end frame;
centering flanges mounting said first end frame in said motor housing;
electrical connections disposed on said first end frame and one of said electrical connections connected to said motor housing, at least one of said electrical connections disposed in said depression of said first end frame;
a first connecting wire connected to one of said electrical connections and inserted into said groove; and
a second connecting wire inserted between said centering flange of said first end frame and said motor housing.

5. The electric motor according to claim 4, wherein said centering flange of said first end frame has an outward bulge extending in a radial direction, said outward bulge having a base on which an end of said second connecting wire is disposed, and said motor housing has a tongue clamping said end of said second connecting wire in on said base of said outward bulge.

6. The electric motor according to claim 4, further comprising a discrete electrical component connected to both the first and second connecting wires, and wherein the second connecting wire electrically connects the discrete electrical component to the motor housing.

7. The electric motor according to claim 4, wherein the discrete electrical component includes a capacitor.

8. The electric motor according to claim 1, wherein the discrete electrical component includes a capacitor.

9. The electric motor according to claim 1, wherein the hollow-cylindrical motor housing includes tongues that fixably engage the first end frame.

10. The electric motor according to claim 4, wherein the hollow-cylindrical motor housing includes metal tongues that fixably engage the first end frame.

* * * * *